(12) United States Patent
Craighead

(10) Patent No.: US 7,356,621 B1
(45) Date of Patent: Apr. 8, 2008

(54) METHOD AND SYSTEM FOR TRANSFERRING DATA BETWEEN A REQUESTING PROGRAM AND A HARDWARE DEVICE

(75) Inventor: Matthew J. Craighead, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 895 days.

(21) Appl. No.: 10/669,805

(22) Filed: Sep. 23, 2003

Related U.S. Application Data

(60) Provisional application No. 60/490,074, filed on Jul. 24, 2003.

(51) Int. Cl.
*G06F 13/28* (2006.01)
*G06F 13/00* (2006.01)

(52) U.S. Cl. .......................... 710/22; 710/56; 710/208

(58) Field of Classification Search ............ 710/22–28, 710/52–56; 711/202–209
See application file for complete search history.

(56) References Cited

U.S. PATENT DOCUMENTS

| | | | |
|---|---|---|---|
| 5,659,798 A * | 8/1997 | Blumrich et al. ............. | 710/26 |
| 6,195,107 B1 * | 2/2001 | Iverson ...................... | 711/203 |
| 6,799,200 B1 * | 9/2004 | Blackmore et al. ......... | 709/212 |
| 6,823,404 B2 * | 11/2004 | Arndt et al. .................. | 710/36 |
| 7,093,097 B2 * | 8/2006 | Herr et al. ................... | 711/171 |
| 2004/0064671 A1 * | 4/2004 | Patil ........................... | 711/203 |
| 2005/0160191 A1 * | 7/2005 | Maciesowicz ................ | 710/1 |

\* cited by examiner

*Primary Examiner*—Christopher Shin

(57) ABSTRACT

Transferring data between a requesting program and a hardware device. An program requests a pre-allocation of non-pageable memory. The program requests a transfer via a direct memory access (DMA) from the hardware device into the non-pageable memory. The requesting program is notified when the DMA is complete. The requesting program reads the data from the non-pageable memory. A determination may be made whether a range of addresses specified in the DMA request is within the pre-allocated range of non-pageable memory. If the range of addresses is within the pre-allocated non-pageable memory, the data transfer involves fewer transfers between system memory and the CPU than if the range of addresses is outside the pre-allocated non-pageable memory.

40 Claims, 9 Drawing Sheets

METHOD AND SYSTEM FOR TRANSFERRING DATA BETWEEN A REQUESTING PROGRAM AND A HARDWARE DEVICE

RELATED APPLICATION

This application claims priority to U.S. Provisional Application entitled, "Method, System, And Device For Transferring Data Between A Requesting Program And A Hardware Device," Application No. 60/490,074 filed on Jul. 24, 2003, which application is hereby incorporated by reference.

FIELD OF THE INVENTION

The present invention relates to the field of computer systems. Specifically, embodiments of the present invention relate to transferring data rapidly between an application program and a hardware device, such as a graphics processor.

BACKGROUND ART

For a variety of reasons, it is desirable for an application program running in a central processing unit (CPU) to be able to rapidly transfer data to or from a graphics processing unit (GPU). For example, the application program may have image data that it wants the GPU to render. Alternatively, the application program may desire to receive pixel data that the GPU generated. Because a GPU is better at generating pixel data than is the CPU, this allows the GPU to be used as a co-processor. These data transfers should be executed as rapidly as possible for efficient rendering and for efficient use of the GPU as a co-processor.

However, conventionally it is difficult to perform an asynchronous Direct Memory Access (DMA) between the GPU and system memory. Conventionally, time consuming additional steps are taken to set up the DMA, thus slowing the overall data transfer rate. The GPU typically requires that any DMA data transfers between it and system memory must at least appear to involve a contiguous range of system memory addresses. However, it is extremely unlikely that system memory will have a contiguous range of memory addresses available for the application program. Conventionally, a graphics aperture re-mapping table (GART) is used to make it appear to the GPU that the data involved in the DMA reside in a contiguous range of memory. FIG. 1A illustrates a memory space 102 including 256 MB of main (physical memory) and a 128 MB Accelerated Graphics Port (AGP) aperture region. The main memory has allocated therein several 4K byte pages, which are allocated during AGP memory initialization and are typically noncontiguous as illustrated. The GART 104 maps the noncontiguous pages in main memory to contiguous pages in the AGP aperture region. Thus, it appears to the GPU that the data is located over a contiguous range of addresses.

However, in order to take advantage of the GART table 104, some conventional techniques require a transfer of data to the region of system memory that was allocated for AGP transfers to a region of system memory that is allocated to the application program for other purposes. This transfer requires several physical data transfers between system memory and the CPU. FIG. 1B illustrates a conventional write to the GPU, in which first the application program copies the data from the CPU 110 to a location in system memory 120 that belongs to the application program. The application program then executes an OpenGL® call to initiate the transfer of the data from application space 121 in system memory 120 to the GPU 140 via the northbridge 130. OpenGL® is a cross-platform standard for 3D rendering and 3D hardware acceleration. Next, the data is transferred from the application space 121 in system memory 120 to the CPU 110 via the northbridge 130. Then, the data is transferred back to a location 123 in system memory 120 that is available to the GART. Finally, an asynchronous DMA is executed to transfer the data to the GPU 140 from the location 123 in system memory 120 that is available to the GART.

Therefore, this sequence requires four separate data transfers. Moreover, three of the data transfers occur on the front-side bus between the CPU 110 and system memory. For many systems, the front-side bus data transfers are considerably slower than the data transfer between system memory and the GPU 140.

A similar problem occurs if the application program desires to read data from the GPU 140. FIG. 2 illustrates a conventional read of data from a GPU 140 to the CPU 110. The sequence starts with the application program making an OpenGL® call to initiate the reading of the image data from the GPU's memory 150. In response to a command from the northbridge 130, the GPU 140 then transfers the image data 125 to a location 123 in system memory 120 to which it has access. This data transfer may be a PCI (Peripheral Component Interconnect) transfer or an AGP transfer. After the data transfer is completed, the northbridge 130 transfers the image data to the CPU 110 from system memory 120. Then, the northbridge 130 transfers the image data back to system memory 120, in an application space 121 of system memory 120. Finally, the application program reads the image data. Thus, again there are three transfers between the CPU 110 and system memory 120.

One reason for the additional and time-consuming transfers between the CPU and system memory is that the extra transfers avoid a call to the operating system to lock-down the system memory involved in the DMA. While a call to the operating system can be made from the application program each time a data transfer is desired, this consumes substantial time relative to the amount of time that is consumed by the extra data transfers. Thus, it is undesirable for the application program to call the operating system to lock-down the application program's memory.

Therefore, it would be advantageous to provide rapid data transfer between an application program and a hardware device, such as a GPU. It would be further advantageous if the method does not require frequent calls from the application program to the operating system to lock down application memory. It would be still further advantageous if the method does not require multiple data transfers between system memory and the CPU.

SUMMARY OF THE INVENTION

Embodiments of the present invention provide rapid data transfer between an application program and a hardware device, such as a graphics processor unit (GPU). Embodiments of the present invention provide a method that does not require multiple data transfer operations between system memory and the CPU. Embodiments of the present invention provide a method that does not require a re-write to the operating system. Embodiments of the present invention provide a method that does not require frequent calls to the operating system to lock down memory. The present invention provides these advantages and others not specifically mentioned above but described in the sections to follow.

A method and system for transferring data between an application program and a hardware device are disclosed. One embodiment is a method of a requesting program accessing data from a hardware device. In this embodiment, non-pageable memory is allocated to a requesting program. The requesting program also requests a data transfer via a DMA from the hardware device into the non-pageable memory. The requesting program also reads the data from the non-pageable memory.

Another embodiment is a method of controlling a data transfer from a hardware device. This embodiment includes receiving a request from a program for a data transfer to/from the hardware device. The request specifies a range of addresses for the transfer the data. The method further includes determining whether the range of addresses is within a pre-allocated range of non-pageable memory. If the range of addresses specified in the request is within the pre-allocated range of non-pageable memory, a DMA is requested between the hardware device and the range of addresses.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, a method and system for rapid data transfer between an application program and a hardware device, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "requesting" or "allocating" or "computing" or "transferring" or "calculating" or "determining" or "receiving" or "initiating" or "notifying" or "generating" or "storing" or "reading" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1A:
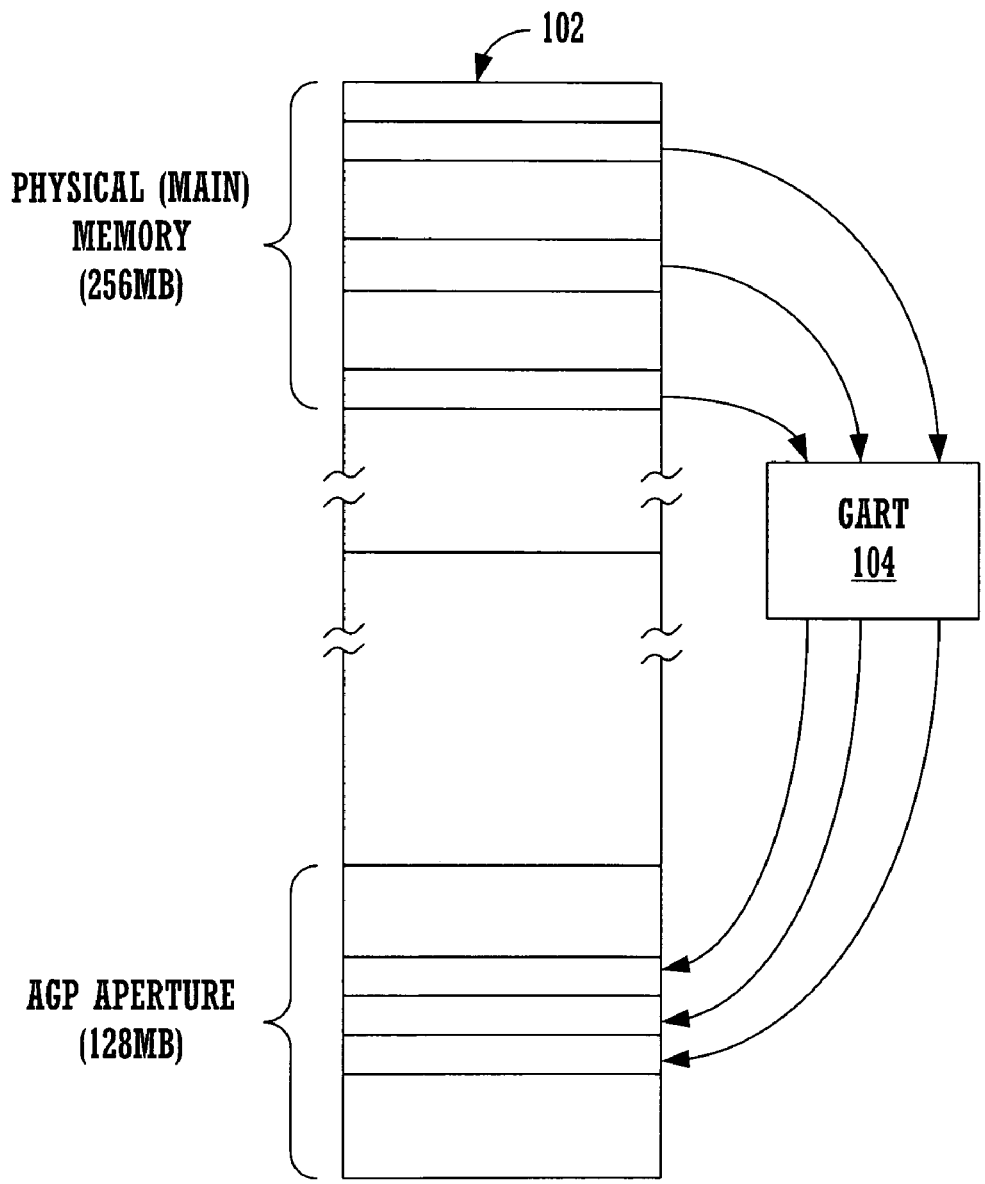
FIG. 1A illustrates a conventional re-mapping of addresses from main memory to an AGP Aperture region.
Figure 1B:
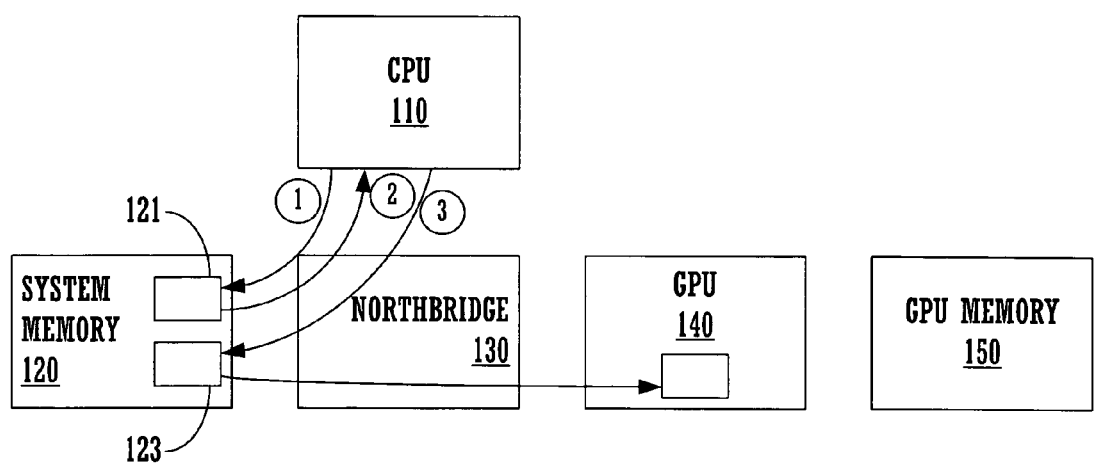
FIG. 1B is diagram of data flow in a conventional scheme for writing data to a GPU.
Figure 2:
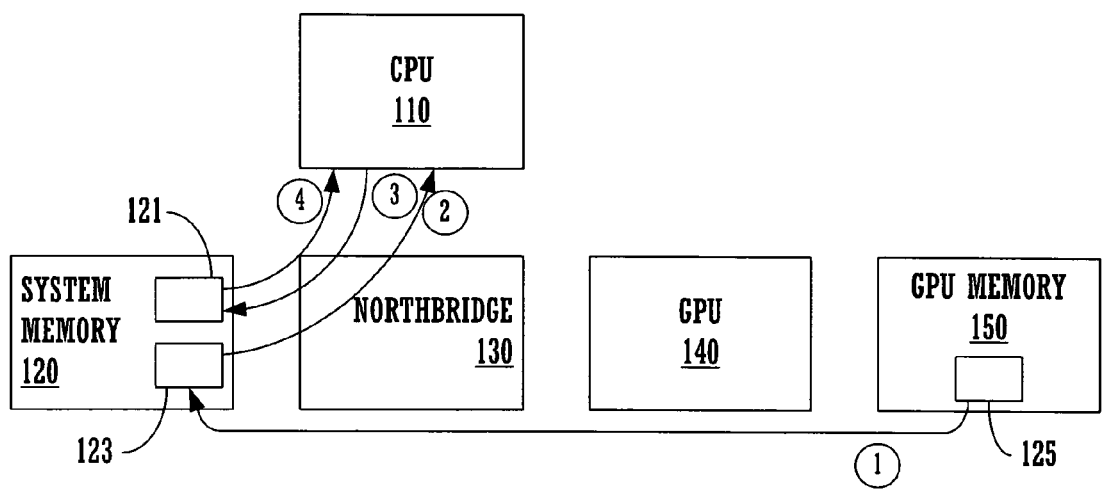
FIG. 2 is diagram of data flow in a conventional scheme for reading data from a GPU.

Embodiments of the invention transfer data between an application and a hardware device, such as a GPU, using fewer data transfer operations than conventional techniques such as those illustrated in FIGS. 1B and 2. Embodiments of the present invention have only a single data transfer operation between system memory and the CPU, in contrast to the three data transfer operations required by the conventional techniques illustrated in FIGS. 1B and 2. Thus, the overall data transfer rate between the application program and the hardware device is faster using embodiments of the present invention than with the cited conventional techniques.

Embodiments of the present invention allow an application program to pre-allocate system memory that is non-pageable. The non-pageable system memory is directly accessible by the application program and is used in DMA operations. An interface is provided by an embodiment of the invention that allows the application program to specify a range of addresses of non-pageable memory that is to be used for either read or write DMA operations. Details of this interface are provided below herein. Any data transfer operations that the application requests to or from a hardware device that involve the range of addresses specified by an application program to a driver through the interface are faster than the conventional methods shown in FIGS. 1B and 2. However, the application program is not required to use the pre-allocated non-pageable memory for data transfers to or from the hardware device. Some embodiments of the invention determine whether a data transfer request between the application program and the hardware device involves the pre-allocated region and transfers the data accordingly. For example, the data transfer may be faster if the request involves the pre-allocated non-pageable memory.

Figure 3:
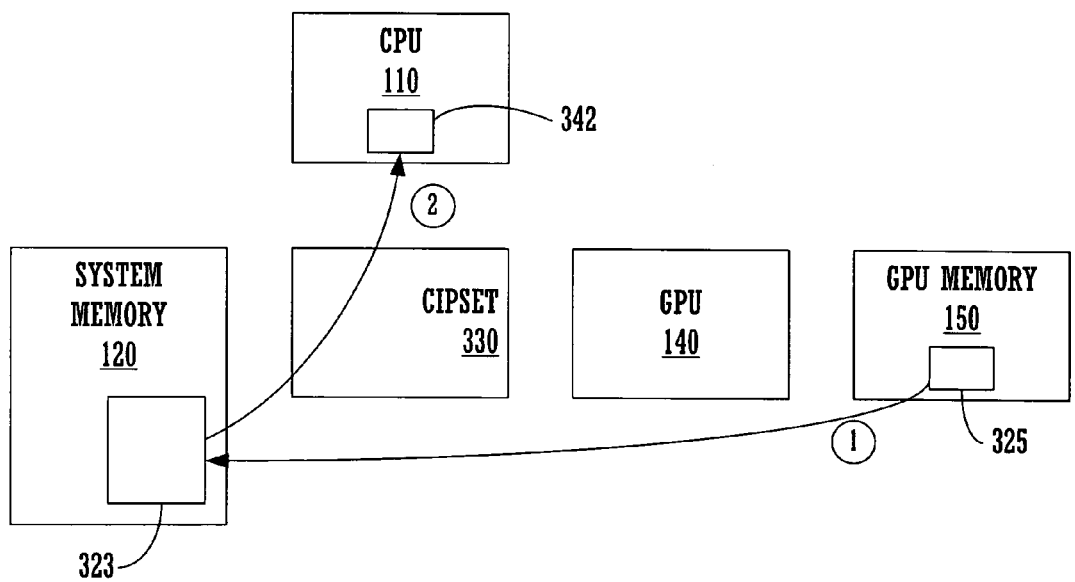
FIG. 3 is a block diagram of a system for transferring data showing data-flow when reading data from a hardware device, according to an embodiment of the present invention.

FIG. 3 is a block diagram of a system 300 for reading data from a hardware device of a computer system, according to an embodiment of the present invention. The hardware device comprises a GPU 140 and GPU memory 150. FIG. 3 shows data flow when reading data from a GPU memory 150, according to an embodiment of the present invention. The application program (not shown) has pre-allocated non-pageable memory in system memory 120. The pre-allocated non-pageable memory is a read DMA data range 323, in this embodiment. An embodiment of the present invention provides an interface for defining the read DMA data range 323. The requested data 325 is initially in the GPU memory 150 coupled to the GPU 140. The first data transfer is to the read DMA data range 323. The second data transfer, controlled by the driver, is from the read DMA data range 323 to a buffer 342 in the CPU 110. Thus, whereas the conventional process illustrated in FIG. 1B requires three data transfers between system memory 120 and the CPU 110, the embodiment in FIG. 3 requires only a single data transfer between system memory 120 and the CPU 110. This is accomplished by pre-allocating the non-pageable memory 323 to the application program. The application can repeatedly use the pre-allocated non-pageable memory 323 for additional data transfers.

As an option, the modules in FIG. 3 may be situated on a single semiconductor platform. As used herein, the single semiconductor platform may refer to a sole unitary semiconductor-based integrated circuit or chip. The term single semiconductor platform may also refer to multi-chip modules with increased connectivity that simulate on-chip operation, and make substantial improvements over utilizing a conventional CPU and bus implementation. The single semiconductor platform can be, for example, a desktop computer system or server computer system, having a powerful general-purpose CPU coupled to a dedicated GPU (graphics processor unit). Similarly, the single semiconductor platform can be implemented as a video game console device such as, for example, the Xbox®, available from Microsoft Corporation of Redmond Wash. Additionally, embodiments of present invention may also be implemented on multiple semiconductor platforms and/or utilizing a conventional CPU and bus implementation.

Figure 4:
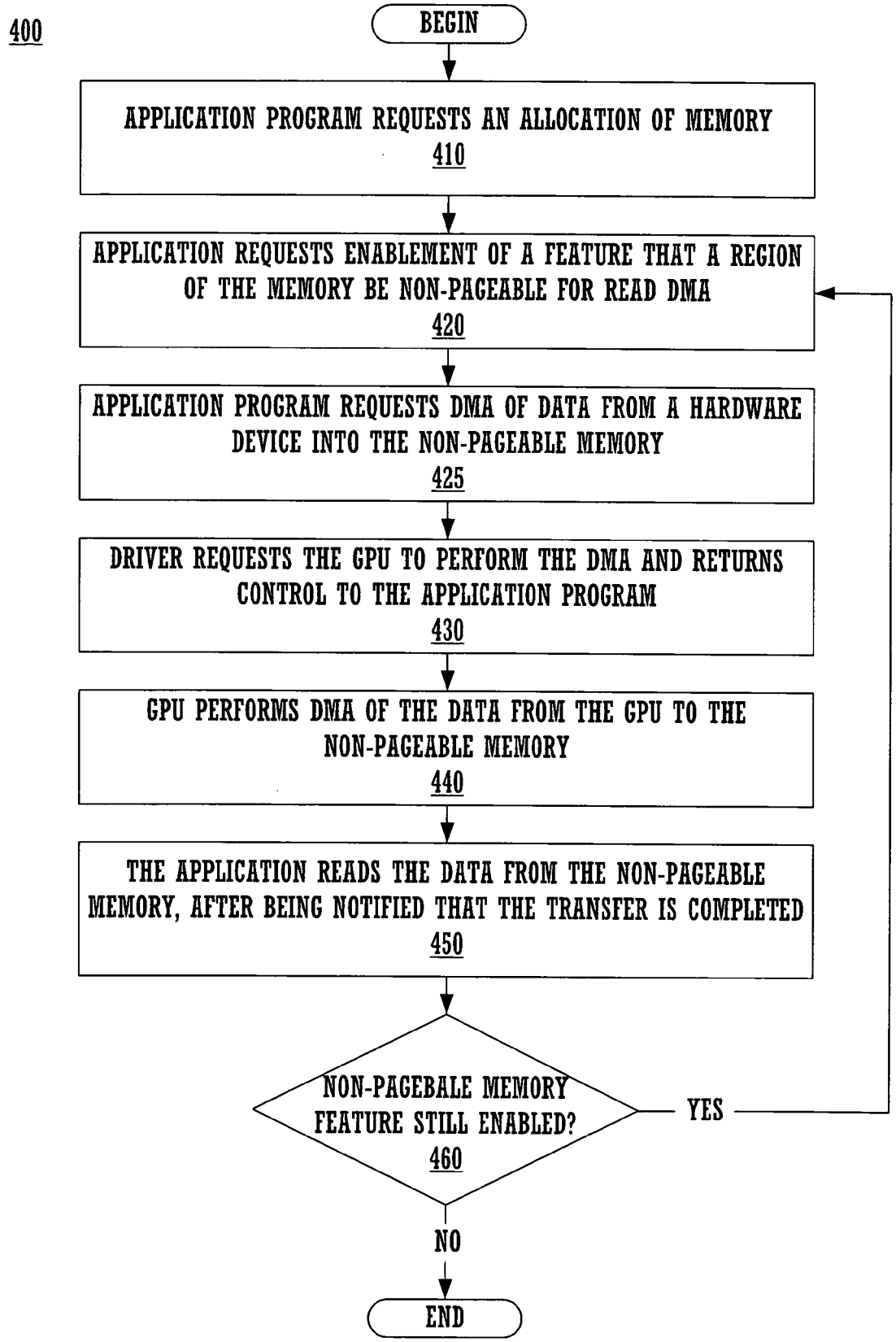
FIG. 4 is a flowchart illustrating a computer-implemented process of transferring data from a hardware device, according to an embodiment of the present invention.

FIG. 4 is a flowchart illustrating a computer-implemented process 400 of transferring data from a hardware device, such as a GPU, to a requesting program, according to an embodiment of the present invention. The requesting program may be an application program but is not so limited. The flow of data in process 400 is illustrated in FIG. 3. In block 410 of process 400 of FIG. 4, an application program requests an allocation of memory. The memory is located within system memory, in one embodiment. A driver that is capable of controlling at least some system memory data transfers receives the request. The driver controls logic in a chipset, such as what is conventionally referred to as "the northbridge," in one embodiment. In one embodiment, the application program performs a call that is compliant with the OpenGL® specification. The call is to "wglAllocateMemoryNV," in one embodiment. Exemplary parameters for the "wglAllocateMemoryNV" call are "read frequency" of 1.0, "write frequency" of 0.0 and "priority" of 1.0.

However, other values for the parameters in the "wglAllocateMemoryNV" call may be used. In one embodiment, the memory that is allocated is AGP memory. For example, the pre-allocated memory resides in a portion of system memory that has been assigned to AGP data transfers. However, the allocated memory does not have to be AGP memory. In another embodiment, the memory is PCI memory. For example, the pre-allocated memory resides in a portion of system memory that has been assigned to PCI data transfers.

In block 420 of process 400, the application program requests a feature be enabled that a region of the pre-allocated memory is made non-pageable for read DMA operations from a hardware device, such as a GPU. This region will be referred to as a read DMA data range and may be used over and over again for many DMA operations, until the read DMA data range is de-allocated. The application's request is received by the driver that received the memory allocation request in block 410. The driver responds to the request by locking down the memory range specified by the application program in the request. Thus, the memory range is made "non-pageable." In one embodiment, the application program performs a call that is compliant with an extension to the OpenGL® specification to specify a range of addresses that is to be used for read DMA operations.

The following is an exemplary "PixelDataRangeNV" call, according to one embodiment of the present invention:

PixelDataRangeNV    (enum    target,    sizei    length,
    void*pointer)

The exemplary "PixelDataRangeNV" call has a parameter for a pointer, which the application program uses to point to the base of the defined region. The exemplary "PixelDataRangeNV" call has a parameter for length, which the application program uses to define the length of the region. The "target" parameter is used to specify whether the DMA to or from the defined region is a read or a write. The token "READ_PIXEL_DATA_RANGE_NV" is used for the "target" parameter of the "PixelDataRangeNV" call to indicate to the driver that the region defined by the application program in the call is to be used for a read DMA, in one embodiment. The present invention is not limited to the exemplary "PixelDataRangeNV" call.

Thus, by executing the acts described in blocks 410 and 420, the application program requests an allocation of non-pageable memory. However, the present invention is not limited to an application program executing the acts described in blocks 410 and 420 to receive an allocation of non-pageable memory. For example, the application program could receive an allocation of non-pageable memory via a single function call.

In block 425, the application program requests a DMA from the hardware device into at least a portion of the read DMA data range. The request is made to the driver that pre-allocated and locked down the memory for the application program. In one embodiment, the application program performs an OpenGL® call to initiate the read from the GPU's memory.

In block 430, the driver requests the GPU to perform the DMA and then returns control to the application program, in response to receiving the OpenGL® call of block 425. Because the data is not yet transferred to system memory, the application program waits for an indication that the transfer is complete before attempting to read the data. However, because control is returned to the application program, the application can perform other tasks while it waits for the data transfer from GPU memory. For example, the application program could make a request for additional data from the GPU or process data that was previously transferred. Furthermore, the application program can initiate a DMA read and a DMA write simultaneously, using the read DMA data range and a write DMA data range to be discussed below. In one embodiment, the application places a fence in the command stream to synchronize its operation with that of the hardware. For example, the fence keeps the application from using the memory involved in the DMA until the hardware is finished with the DMA.

In block 440, the GPU performs a DMA of the data from the GPU memory to the location specified in the request of block 430. Thus, the data is copied to at least a portion of the read DMA data range.

In block 450, the application reads the data from system memory, after being notified that the transfer has been completed. In various embodiments, the application program uses either a fence command or the FlushPixelDataRangeNV function to receive an indication that the hardware has finished the DMA. Thus, whereas the conventional process illustrated in FIG. 2 requires three data transfers between system memory and the CPU, process 400 requires only a single data transfer between system memory and the CPU.

An embodiment of the present invention provides a function call that the application program can call to disable the read DMA data range. As long as the read DMA data range remains enabled, the application program may use the read DMA data range again for another read DMA operation. In block 460, the process 400 either ends or returns to block 425 depending on whether the read DMA data range feature is still enabled.

Figure 5:
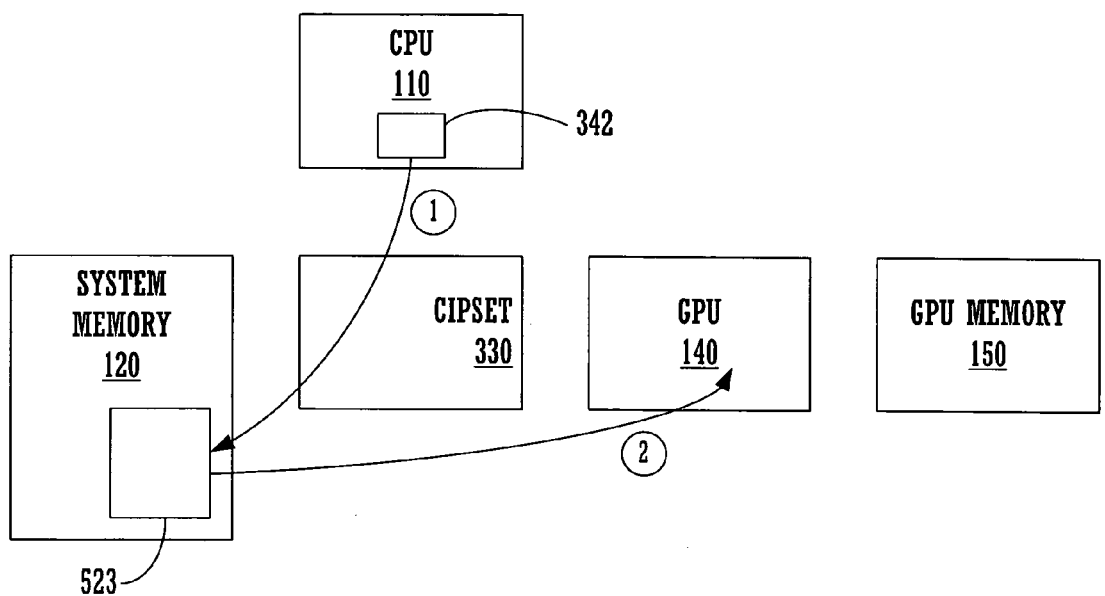
FIG. 5 is a block diagram of a system for transferring data showing data flow when writing data to a hardware device, according to an embodiment of the present invention.

Embodiments of the present invention also provide a fast and convenient method of writing data to a hardware device, such as a GPU. FIG. 5 is a system 500 for transferring data to a hardware device, showing associated data flow, according to an embodiment of the present invention. The hardware device is a GPU, in one embodiment. The application program (not shown) has pre-allocated non-pageable memory, which in this embodiment is a write DMA data range 523. An embodiment of the present invention provides an interface for defining the write DMA data range 523. The first data transfer is from a buffer 342 in the CPU 110 to the write DMA data range 523. The driver controls this data transfer. The second data transfer is from the write DMA data range 523 to the GPU 140. Thus, whereas the conventional process illustrated in FIG. 1B requires three data transfers between system memory 120 and the CPU 110, the embodiment in FIG. 5 requires only a single data transfer between system memory 120 and the CPU 110.

Figure 6:
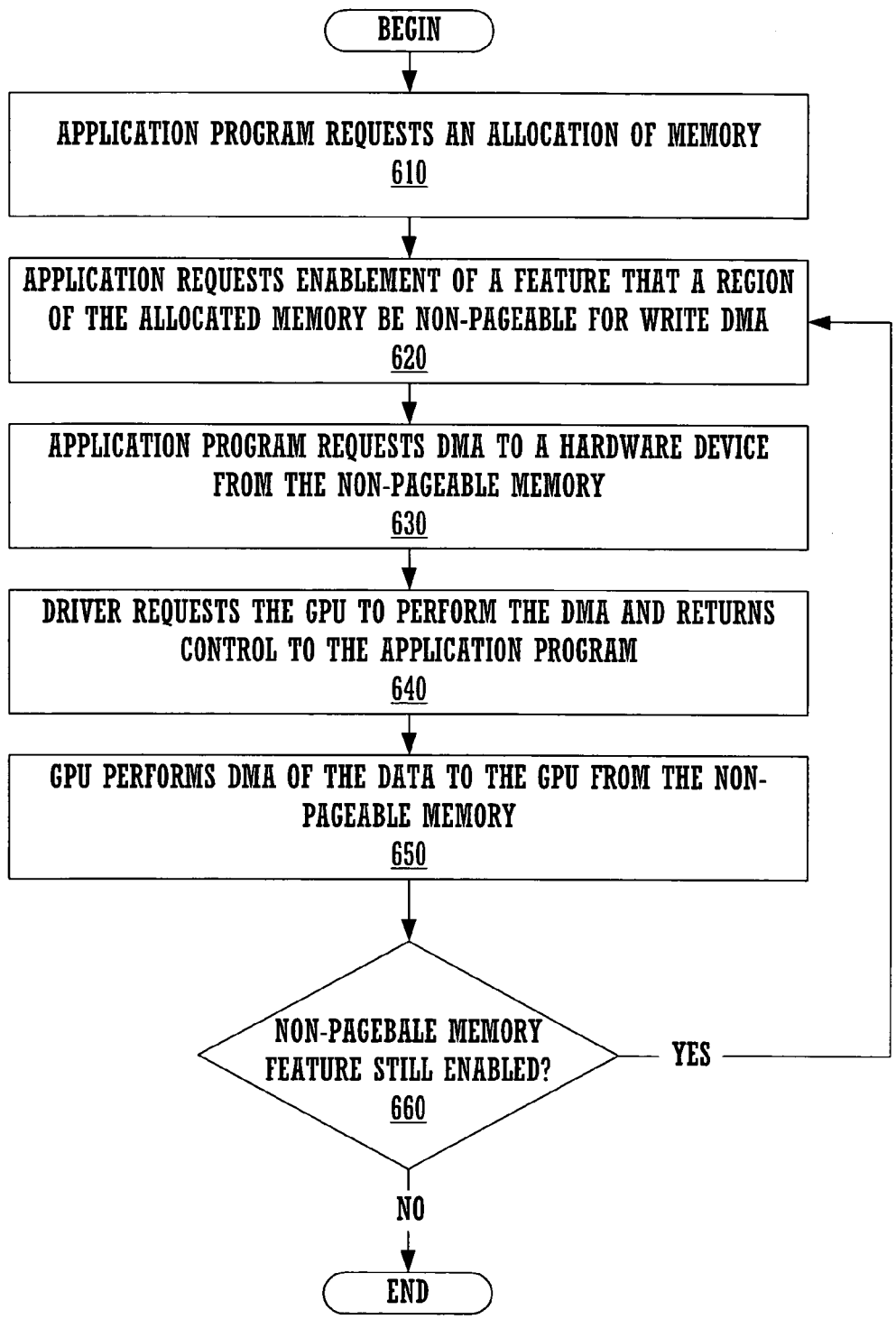
FIG. 6 is a flowchart illustrating a computer-implemented process of transferring data from a hardware device, according to an embodiment of the present invention.

FIG. 6 is a flowchart illustrating a computer-implemented process 600 of an application program writing data to a hardware device, according to an embodiment of the present invention. In block 610 of process 600 of FIG. 6, an application program requests a memory allocation. The application program makes a call to "wglAllocateMemoryNV" to receive a memory allocation, in one embodiment. Because the type of memory that is most suitable for a DMA write may be different than the type of memory that is most suitable for a DMA read, the application program may choose parameters in the wglAllocateMemoryNV" call based on how the application intends to use the pre-allocated memory. Exemplary parameters for the "wglAllocateMemoryNV" call in block 610 are "read frequency" of 0.0, "write frequency" of 1.0 and "priority" of 1.0. However, other values for the parameters in the wglAllocateMemoryNV" call may be used and the application may use the pre-allocated memory for a read DMA as well a write DMA. The request is received by a driver that is capable of controlling at least some data transfers involving the memory receives the request. In one embodiment, the memory is memory that is allocated for AGP transfers. However, the memory does not have to be AGP memory. In another embodiment, the memory is memory that is allocated for PCI transfers.

In block 620 of process 600, the application program requests that a feature be enabled such that a region of the memory pre-allocated in block 610 be made non-pageable for write DMA to a hardware device, such as a GPU. This region will be referred to as a write DMA data range. By defining write DMA data range, embodiments provide a faster overall transfer rate for data transfers to the hardware device from this region than the conventional read shown in FIG. 1B. The request is received by the driver that received the memory allocation request in block 610. In one embodiment, the application program performs a call that is compliant with the OpenGL® specification. The call is to the previously discussed exemplary "PixelDataRangeNV" function, according to one embodiment of the present invention. The application program defines the write DMA region in a similar fashion as to establishing a read DMA region. The write DMA data range can overlap a read DMA data range, in which case the driver synchronizes data transfers for the application program, in one embodiment.

Thus, by executing the acts described in blocks 610 and 620, the application program requests an allocation of non-pageable memory. However, the present invention is not limited to an application program executing the acts described in blocks 610 and 620 to receive an allocation of non-pageable memory. For example, the application program could receive an allocation of non-pageable memory via a single function call.

In block 625, the application program requests a DMA to the hardware device from at least a portion of the write DMA data range. In one embodiment, the application program performs an OpenGL® call to initiate the write from the GPU's memory.

In block 630, the driver request the GPU to perform the DMA and then returns control to the application program. Because the data is not yet transferred from system memory to the hardware device, the application program waits for an indication that the transfer is complete before performing any action that could affect the data waiting to be transferred from system memory. However, because control is returned to the application program, the application can perform other tasks while it waits for the data transfer from GPU memory. For example, the application program could make a request for additional data from the GPU or process data that was previously transferred. In one embodiment, the application places a fence in the command stream to synchronize with the hardware that is performing the DMA.

In block 640, the GPU performs a DMA of the data to the GPU memory from the write DMA data range. Thus, whereas the conventional process illustrated in FIG. 1B requires three data transfers between system memory and the CPU, process 600 requires only a single data transfer between system memory and the CPU.

An embodiment of the present invention provides a function call that the application program can call to disable the write DMA data range. As long as the write DMA data range remains enabled, the application program may use the write DMA data range again for another write DMA operation. In block 650, the process 600 either ends or returns to block 620 depending on whether the feature for write DMA data range remains enabled.

Figure 7:
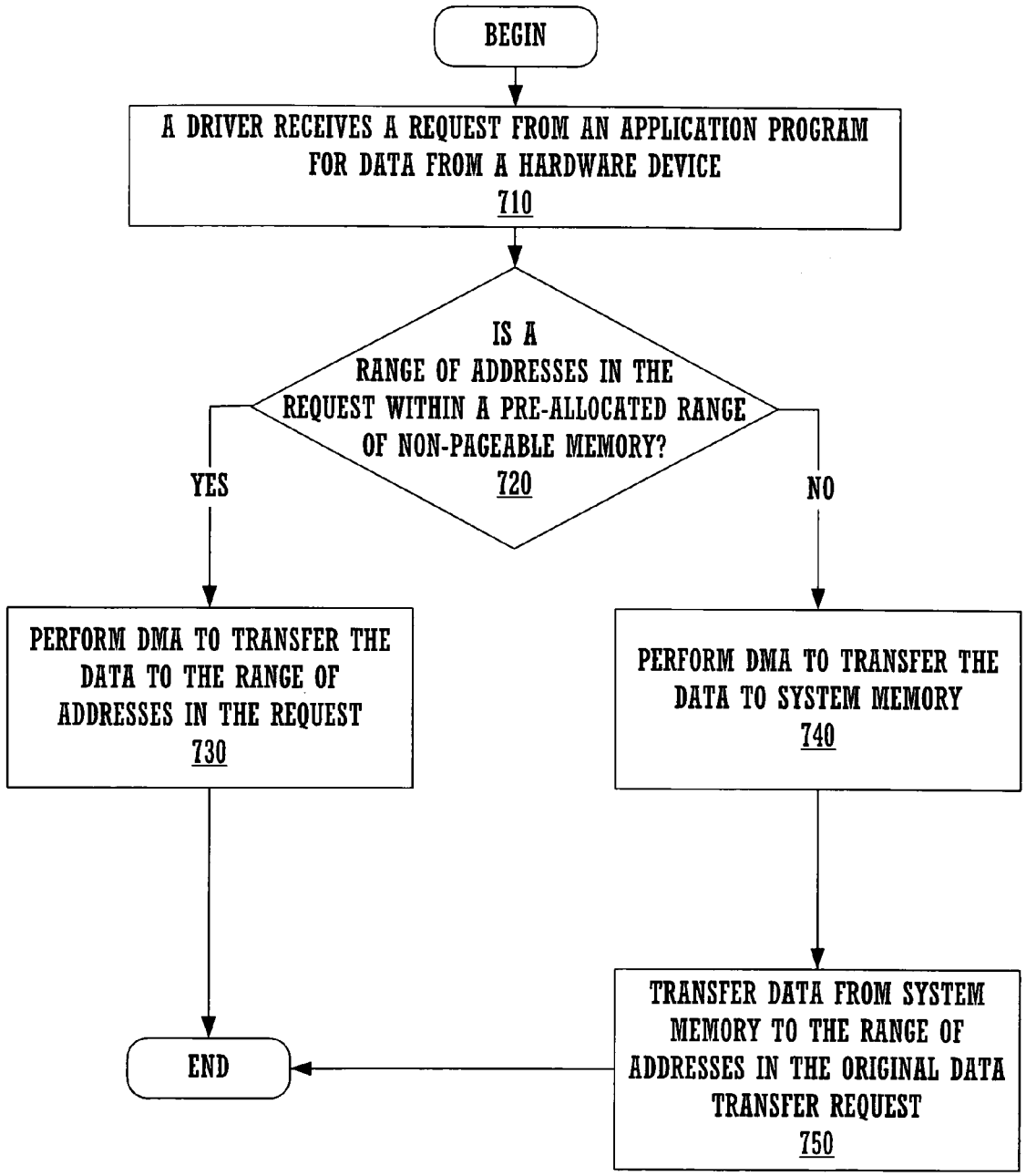
FIG. 7 is a flowchart illustrating a computer-implemented process of determining data-flow during a read from a hardware device, according to an embodiment of the present invention.

FIGS. 3-6 illustrate embodiments in which there is a single data transfer between the CPU and system memory. However, the application program is free to request a data transfer to or from a region of system memory other than the pre-allocated non-pageable memory. For example, the application program is not required to use a read DMA data range or a write DMA data range. In this event, however, there are multiple data transfers between the CPU and system memory. FIG. 7 is a flowchart illustrating a computer-implemented process 700 of determining whether a single data transfer between the CPU and system memory will suffice or whether multiple data transfers are required, according to one embodiment of the present invention. The embodiment of FIG. 7 pertains to a read from the hardware device to system memory. In block 710, a driver receives a request from an application program for data from a hardware device. The hardware device is a GPU, in one embodiment.

In block 720, a determination is made whether a range of addresses in the request from block 710 is within a pre-allocated range of non-pageable memory. This determination is made by a driver coupled to system memory, in one embodiment. As discussed herein, an API provided by an embodiment of the present invention allows the application program to define a region of non-pageable memory that is for DMA read operations from a hardware device. Thus, in one embodiment, the driver determines whether the current DMA request involves system memory that is entirely within the read DMA data range.

If the range of addresses in the request is within the pre-allocated range of non-pageable memory, a DMA is performed to transfer the data to the addresses in the request, in block 730. The DMA is initiated by the GPU in response to a request from the driver, in one embodiment. This allows the data to be available to the application program to read directly from within the non-pageable memory locations. For purposes of this description, "reading directly from the non-pageable memory locations" means that only one data transfer has to be performed between system memory and the CPU for the application program to access data that was transferred from a hardware device to the system memory.

In some instances, the test in block 720 will determine that the range of addresses in the data transfer request is not within the pre-allocated range of non-pageable memory. To cover these cases, the acts in blocks 740-750 are performed.

In block 740, a DMA is performed to transfer the data to system memory. The driver selects any suitable location in system memory for the data transfer. This location is not the location specified in the data transfer request, as that location is outside of the pre-allocated non-pageable memory. In block 750, the data is transferred from the location in system memory to which the DMA was performed in block 740 to the memory location in system memory specified by the application program in the original data transfer request. The data now reside in a location of system memory over which the application program has control and from which the application program can read without concern over another process writing over. If the data is now swapped out of system memory by the operating system, the data can easily be retrieved by referencing a page table (not shown) in a normal fashion.

Figure 8:
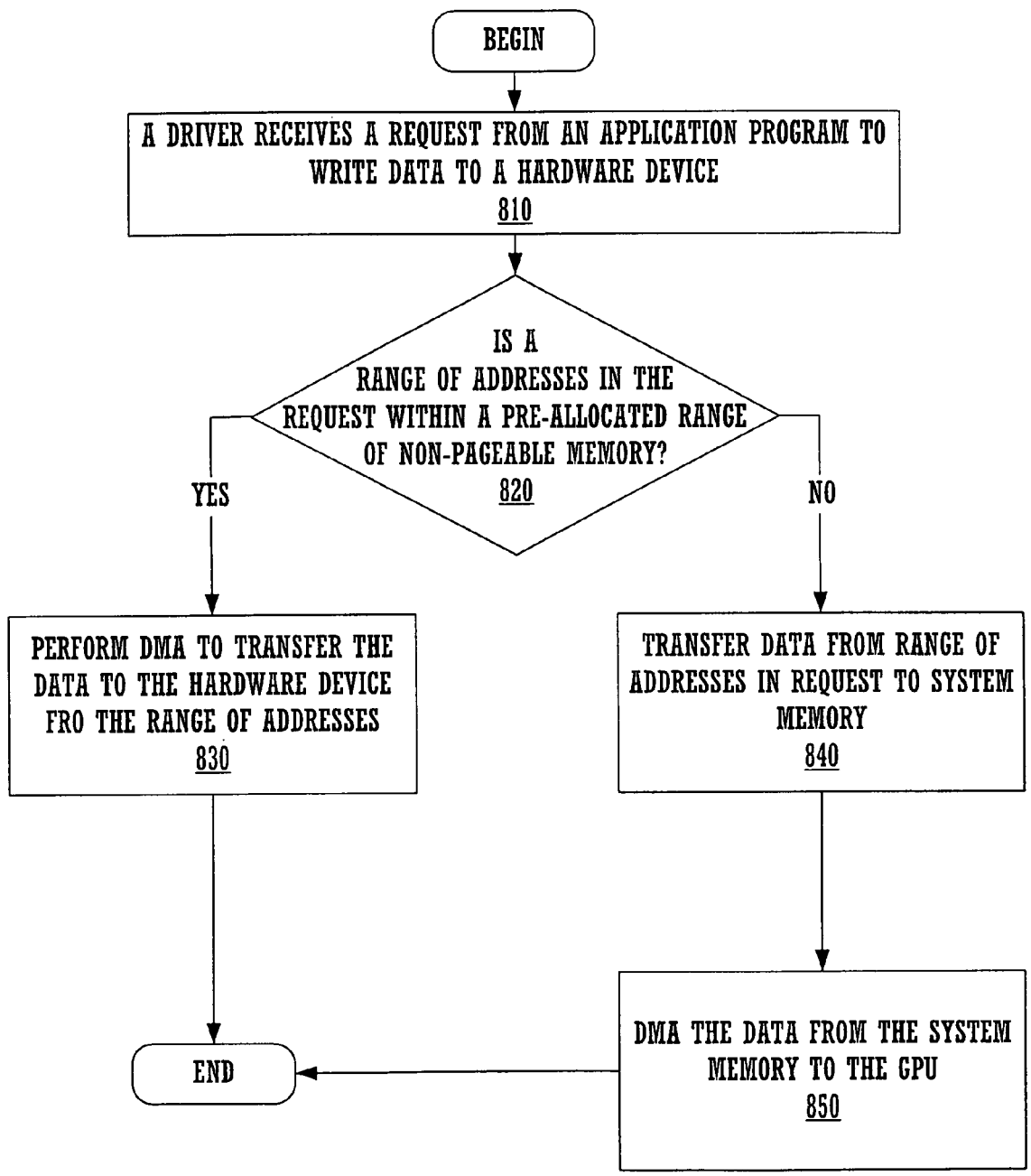
FIG. 8 is a flowchart illustrating a computer-implemented process of determining data-flow during a write to a hardware device, according to an embodiment of the present invention.

FIG. 8 is a flowchart illustrating a computer-implemented process 800 of controlling a data transfer to a hardware device that is similar to process 700 of FIG. 7. However, process 800 pertains to a write to GPU memory. In block 810, a driver receives a request from an application program to write data to a hardware device. The hardware device is a GPU, in one embodiment.

In block 820, a determination is made whether a range of addresses is within a pre-allocated range of non-pageable memory. This determination is made by a driver, in one embodiment. As discussed herein, an API provided by an embodiment of the present invention allows the application program to define a range of non-pageable memory that is to be used for DMA write operations. Thus, the determination in this block is whether the range of addresses fall entirely within the region defined by the application to be used for DMA write operations.

If the range of addresses in the data transfer request is within the pre-allocated range of non-pageable memory, a DMA is performed to transfer the data to the GPU memory from the non-pageable memory, in block 830. The DMA is initiated by the GPU in response to a request from the driver, in one embodiment. This allows the data to be written by the application program directly to the non-pageable memory. For purposes of this description, "writing directly to the non-pageable memory" means that only one data transfer is performed between system memory and the CPU for the application program to write the data to the hardware device.

In some instances, the test in block 820 will determine that the range of addresses in the data transfer request is not within the pre-allocated range of non-pageable memory. To cover these cases, the acts described in blocks 840-850 are performed.

In block 840, the data is transferred from the memory locations that are not within the pre-allocated range of addresses system memory to another location within system memory. The driver selects a suitable portion of system memory. This system memory is not the non-pageable memory that was pre-allocated to the application program. In block 850, a DMA is performed to transfer the data to the GPU from the system memory.

The data in processes 400, 500, 700, and 800 of FIGS. 4, 5, 7, and 8 are image data in some embodiments. The image data is pixel data, texel data, and vertex data, in various embodiments. However, the present invention is not limited to transferring these data types.

In processes 400, 500, 700, and 800 of FIGS. 4, 5, 7, and 8, the DMA into non-pageable memory is performed using an address re-mapping table, in some embodiments. In some embodiments, the address re-mapping table uses a GART table. However, in other embodiments, the DMA is performed without using an address re-mapping table. In some embodiments, cache-snooping is performed during the DMA. For example, if the memory pre-allocated to the application program is PCI memory, the memory may be cached. In this case, the GPU snoops the cache when doing the DMA to determine if the cache pipeline needs to be flushed before performing the DMA from GPU memory to system memory.

The preferred embodiment of the present invention, a method and system for rapid data transfer between an application program and a hardware device is thus described. While the present invention has been described in particular embodiments, it should be appreciated that the present invention should not be construed as limited by such embodiments, but rather construed according to the below claims. In the claims, the order of elements does not imply any particular order of operations, steps, or the like, unless a particular elements makes specific reference to another element as becoming before or after.

What is claimed, is:

1. A method of transferring data comprising:
   a) allocating, in response to a request from an application program, non-pageable memory in a memory, wherein said non-pageable memory is accessible to said application program;
   b) transferring data via a direct memory access (DMA) from a hardware device into said non-pageable memory in response to a request from said application program; and
   c) transferring said data from said non-pageable memory to a buffer in response to a request from said application program.

2. The method of claim 1, wherein said a) comprises a driver receiving said request for said non-pageable memory that is accessible by said requesting application program.

3. The method of claim 1, further comprising a driver notifying said requesting application program when said DMA is complete.

4. The method of claim 1, wherein said requesting said allocation of non-pageable memory comprises specifying a range of address to be used for DMA transfers from said hardware device.

5. The method of claim 1, wherein said hardware device is a graphics device.

6. The method of claim 1, wherein said hardware device is a network device.

7. The method of claim 1, wherein said data is pixel data.

8. The method of claim 1, wherein said data is texel data.

9. The method of claim 1, wherein said data is vertex data.

10. The method of claim 1, wherein said DMA is performed using an address re-mapping table.

11. The method of claim 1, wherein said non-pageable memory is within a graphics aperture re-mapping table (GART) address space.

12. The method of claim 1, wherein said non-pageable memory is AGP (Accelerated Graphics Port) memory.

13. The method of claim 1, wherein said non-pageable memory is PCI (Peripheral Component Interconnect) memory.

14. The method of claim 1, wherein said DMA comprises central processing unit (CPU) cache snooping.

15. The method of claim 1, wherein said b) comprises a driver requesting a direct memory access (DMA) data transfer from said hardware device into said non-pageable memory in response to receiving said request for said data transfer.

16. A method of controlling data transfer from a hardware device, comprising:
   receiving a request from an application program for a data transfer, said request specifying a range of addresses in which to transfer said data;
   determining whether said range of addresses is within a pre-allocated range of non-pageable memory; and
   if said range of addresses specified in said request is within said pre-allocated range of non-pageable memory, requesting a DMA between a hardware device and said range of addresses, wherein said data is transferable directly between said application program and said range of addresses in said pre-allocated non-pageable memory.

17. The method of claim 16, wherein if said range of addresses specified in said request is within said pre-allocated range of non-pageable memory, said data is available to said application program to read directly from within said non-pageable memory.

18. The method of claim 16, wherein if said range of addresses specified in said request is within said pre-allocated range of non-pageable memory, said data is transferable directly from said application program to said range of addresses in said pre-allocated non-pageable memory.

19. The method of claim 16, further comprising:
   if said range of addresses specified in said request is not within said pre-allocated range of non-pageable memory:
      requesting a DMA of said data from said hardware device to system memory;
      transferring said data from said system memory to a buffer; and
      transferring said data from said buffer to said range of addresses specified in said request, wherein said data is available to said application program.

20. The method of claim 16, further comprising:
   if said range of addresses specified in said request is not within said pre-allocated range of non-pageable memory:
      transferring said data from said range of addresses specified in said request to a buffer;
      transferring said data from said buffer to system memory; and
      requesting a DMA of said data from said system memory to said hardware device.

21. The method of claim 16, wherein said determining whether said range of addresses is within said pre-allocated range of non-pageable memory comprises determining whether said range of addresses is within a range of address specified by said application program as for read DMA operations.

22. The method of claim 16, wherein said determining whether said range of addresses is within said pre-allocated range of non-pageable memory comprises determining whether said range of addresses is within a range of address specified by said application program as for write DMA operations.

23. The method of claim 16, wherein said hardware device is a graphics device.

24. The method of claim 16, wherein said hardware device is a network device.

25. The method of claim 16, wherein said data is pixel data.

26. The method of claim 16, wherein said data is texel data.

27. The method of claim 16, wherein said data is vertex data.

28. The method of claim 16, further comprising:
   if said range of addresses in said request is within said pre-allocated range of non-pageable memory, transferring said data directly between said range of addresses within said non-pageable memory and a buffer that is accessible to said application program.

29. The method of claim 16, wherein said DMA comprises using an address re-mapping table.

30. The method of claim 16, wherein said non-pageable memory is within a graphics aperture re-mapping table (GART) address space.

31. The method of claim 16, wherein said non-pageable memory is AGP (Accelerated Graphics Port) memory.

32. The method of claim 16, wherein said non-pageable memory is PCI (Peripheral Component Interconnect) memory.

33. The method of claim 16, wherein said DMA includes central processing unit (CPU) cache snooping.

34. The method of claim 16, wherein said DMA is performed using an address re-mapping table.

35. A system for transferring data, comprising:
a first processing unit;
a memory coupled to said first processing unit; and
a second processing unit coupled to said memory;
wherein said system is operable to:
 allocate, in response to a request from an application program, non-pageable memory in said memory, wherein said non-pageable memory is accessible by said application program;
 initiate a transfer of data via a direct memory access (DMA) from said second processing unit into said non-pageable memory in response to a request from said application program; and
 transfer said data from said non-pageable memory to a buffer in response to a request from said application program.

36. The system of claim 35, wherein second processing unit comprises a graphical processor unit (GPU).

37. The system of claim 35, wherein second processing unit comprises a network processor unit (NPU).

38. The system of claim 35, wherein said system is further operable to transfer said data directly from said non-pageable memory to said buffer.

39. The system of claim 35, wherein said DMA uses an address re-mapping table.

40. A system for transferring data, comprising:
a first processing unit;
a memory coupled to said first processing unit; and
a second processing unit coupled to said memory;
wherein said system is operable to:
receive a request from an application program for a data transfer involving said second processing unit;
determine whether a range of addresses specified in said request is within a pre-allocated range of non-pageable memory; and
if said range of addresses specified in said request is within said pre-allocated range of non-pageable memory, request a direct memory access (DMA) of said data between said second processing unit and said range of addresses, wherein said data is transferable directly between said application program and said range of addresses in said pre-allocated non-pageable memory.

\* \* \* \* \*